United States Patent [19]

Barnes

[11] 4,334,407
[45] Jun. 15, 1982

[54] COMPRESSED GAS OPERATED TURBINE

[76] Inventor: Ulpiano Barnes, Laguna Garden 3, Apt. 12L, Loiza Sta., P.R. 00913

[21] Appl. No.: 114,365

[22] Filed: Jan. 22, 1980

[51] Int. Cl.³ .......................................... F15B 11/06
[52] U.S. Cl. ...................................... 60/407; 60/412; 417/339
[58] Field of Search ................... 60/407, 412; 417/323, 417/339, 349

[56] References Cited

U.S. PATENT DOCUMENTS

| | | | |
|---|---|---|---|
| 2,391,972 | 1/1946 | Hufford et al. | 417/323 |
| 2,872,778 | 2/1959 | Dane | 417/339 X |
| 3,379,008 | 4/1968 | Manganaro | 60/412 X |
| 3,589,838 | 6/1971 | Tuzson | 417/339 |
| 4,060,987 | 12/1977 | Fisch et al. | 60/412 X |

Primary Examiner—Irwin C. Cohen
Attorney, Agent, or Firm—Scrivener, Clarke, Scrivener and Johnson

[57] ABSTRACT

The disclosure is of a system for operating a turbine without production of steam by compressing a gas, supplying the gas to the turbine, and returning the reduced pressure gas to the compressing means.

1 Claim, 1 Drawing Figure

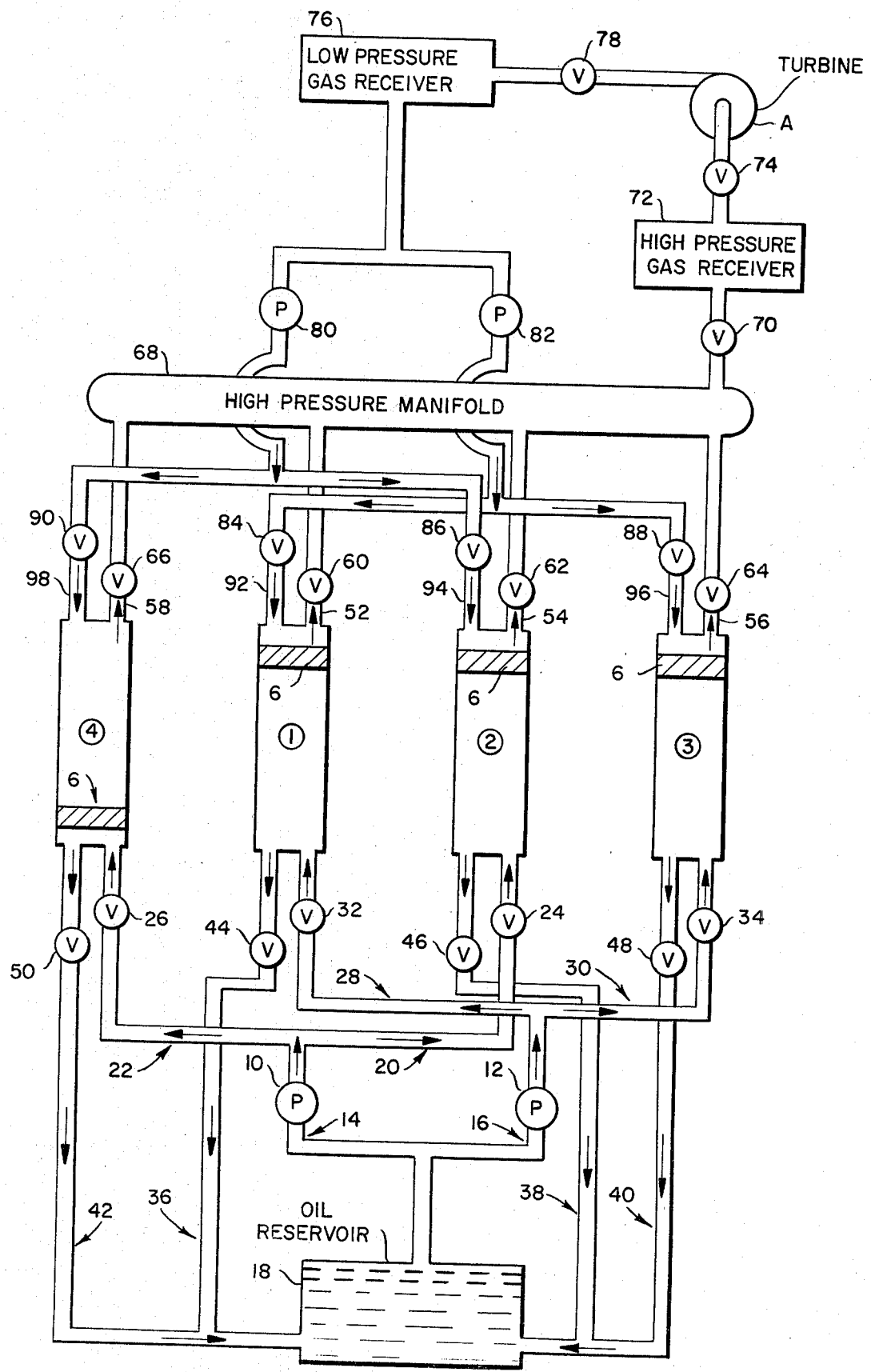

COMPRESSED GAS OPERATED TURBINE

SUMMARY OF THE INVENTION

The system for operating a turbine comprises a closed system including the rotor chamber of the turbine and, in sequence, one of a plurality of chambers in which a gas is compressed, together with means for supplying the compressed gas to the rotor chamber and returning it to another of the chambers in which gas is re-compressed and again supplied to the rotor chamber.

DESCRIPTION OF THE DRAWINGS

The single FIGURE of the drawings is a diagramatic illustration of a preferred form of the system provided by the invention for operating a turbine.

DESCRIPTION OF THE INVENTION

The preferred embodiment of the system for operating a turbine A, as illustrated in the accompanying drawing, comprises a plurality (preferably four as in the illustrated embodiment) of cylinders 1, 2, 3 and 4, which numerals not only designate the cylinders but also indicate their sequence of operation. A free piston 6 is slidably positioned within each cylinder, dividing the cylinder into an intake, or oil side, and an outlet, or gas side, which are, respectively, below and above the piston in each cylinder.

Means are provided by the invention for supplying oil under pressure to the oil side of the cylinders in the described sequence in order to operate the pistons in gas-compression direction in the same sequence. These means comprise two oil pumps 10, 12, the intake sides of which are connected by conduits 14, 16 to hydraulic reservoir 18. The outlet side of pump 10 is connected through conduits 20, 22, which include open-shut valves 24, 26 respectively, to the inlet ports in the oil sides of cylinders 2 and 4, and the outlet side of pump 12 is connected through conducts 28, 30, which include open-shut valves 32, 34, respectively, to the inlet ports in the oil sides of cylinders 1 and 3. The outlet ports in the oil sides of the four cylinders 1, 2, 3 and 4 are connected to oil reservoir 18 by conduits 36, 38, 40, 42 which include valves 44, 46, 48, 50. Pumps 10, 12 operate continuously and the valves 24, 26, 32, 34 are operated to open or closed positions in the described sequence to supply oil to the cylinders and operate the pistons in that sequence, and the valves 44, 46, 48, 50 are operated to exhaust oil from the cylinders in the desired sequence after the power stroke of each piston. Thus, with the pistons in the described positions, the sequence of operation of the oil inlet valves is 26, 32, 24, 34 and that of the oil exhaust valves is 50, 44, 46, 48. The diameter of each oil inlet conduit is less than that of the pistons, and there is a corresponding multiplication of the pressure of oil delivered by the pumps which according to Pascal's law is directly proportional to the area of each discharge conduit and the area of the connected piston, it being understood that the diameters of the oil inlet conduits are equal and those of the pistons are equal but greater than those of the conduits. The smaller the diameter of the oil conduits with respect to that of the pistons the greater the multiplication factor.

The gas sides of cylinders 1, 2, 3, 4 are connected to the rotor chamber of the turbine A by conduits 52, 54, 56, 58, respectively, which include, respectively, solenoid operated open-shut high pressure gas discharge valves 60, 62, 64, 66 the outlet sides of which are connected through high pressure manifold 68 and open-shut valve 70 to the high pressure gas receiver 72, and through open-shut valve 74 to the rotor chamber of the turbine A. The valves 60, 62, 64, 66 are operated in the sequence of operation of the pistons of cylinders 1, 2, 3, 4 to deliver high pressure gas from the cylinders to the manifold 68. Valve 70 is maintained open during the operation of the system to cause a steady supply of high pressure gas to the high pressure reservoir 72. Valve 74 is maintained open during the operation of the system to cause a steady supply of high pressure gas to the turbine chamber from the high pressure gas reservoir 72. Valves 70 and 74 are closed when the system is not in operation.

Low pressure gas from the exhaust side of the turbine is supplied to the gas side of the cylinders 1, 2, 3 and 4 in the sequence required by the described sequence of operation of the pistons. Low pressure gas from the outlet side of the turbine is supplied to the low pressure receiver 76 through solenoid operated open-shut valve 78 which is maintained open during operation of the system and from the receiver low pressure gas is supplied through metering pumps 80, 82 to the inlet side of open-shut solenoid operated valves 84, 86, 88, 90 the output sides of which are connected through conduits 92, 94, 96, 98 to the inlet ports in the gas sides of cylinders 1, 2, 3, 4.

In preparation for operation of the disclosed system the positions of the pistons are adjusted so that the piston in cylinder 4 is at its extreme lower position. There is no gas or oil in that cylinder and it is ready to be filled with low pressure gas from the turbine outlet through valve 78, low pressure gas receiver 76, metering pump 80 and open-shut solenoid operated valve 90. The pistons in cylinders 1, 2 and 3 are in their extreme upper positions, oil under pressure is below the piston in each cylinder and gas under low pressure is above each such piston. The remainder of the gas side of the system, consisting of conduits 52, 54, 56, 58, high pressure manifold 68 and high pressure gas receiver 72 is filled with high pressure gas, and valves 70 and 74 are closed because the system is not operating. The low pressure gas receiver 76 is filled with low pressure gas. Valve 78 is closed because the system is not operating.

The system is now set in motion to operate the turbine by starting pumps 10 and 12 and energizing the solenoid means which operates oil inlet valves 32, 24, 34, 26 and oil return valves 44, 46, 48, 50 causing oil under pressure to be supplied to the oil side of cylinders 1, 2, 3, 4 and then to be returned to oil reservoir 18 in the described sequence. At the same time the solenoid control means are energized to open valves 70, 74, 78 and to operate high pressure gas valves 60, 62, 64, 66 and low pressure valves 84, 86, 88, 90 in the sequence required to feed high pressure gas to the rotor chamber of the turbine, and to feed low pressure gas from the turbine exhaust through pumps 80, 82 to cylinders 1, 2, 3 and 4 in the described sequence. Thus, the sequence of operation of the turbine drive means is as follows.

High pressure gas discharge valve 60 of cylinder 1 and low pressure gas intake valve 90 of cylinder 4 open. High pressure gas from cylinder 1 flows to the turbine rotor chamber through high pressure receiver 72 and valves 70, 74 which are open, producing rotation of the turbine rotor. Low pressure gas flows from the turbine outlet through solenoid valve 78 into low pressure receiver 76 and through metering pump 80 through valve 90 into cylinder 4, charging it. When cylinder 4 is charged valves 84 and 90 close. Simultaneously valves 26, 62 and 84 open. Oil is admitted into cylinder 4 starting compression of the gas, and then oil is discharged from cylinder 1 through valve 44, preparing preparing cylinder 1 for charging with low pressure gas through valve 84. High pressure gas discharge valve 62 of cylinder 2 and low pressure gas intake valve 84 of cylinder 1 open. High pressure gas from cylinder 2 flows through the high pressure receiver 72 and through valves 70, 74, which are open, to the turbine rotor chamber causing rotation. Low pressure gas flows from the turbine exhaust through solenoid valve 78 into low pressure receiver 76 and through metering pump 82 and valve 84 into cylinder 1 charging it. When cylinder 1 is charged valves 62 and 84 close. Simultaneously valves 32, 94 and 86 open. Oil is admitted into cylinder 1 starting compression of the gas and oil is then discharged from cylinder 2 through valve 46 preparing cylinder 2 for charging with low pressure gas through valve 86. High pressure gas discharge valve 64 of cylinder 3 and low pressure gas intake valve 86 of cylinder 2 open. High pressure gas from cylinder 3 flows through the high pressure receiver 72 and through valves 70, 74, which are open, to the turbine rotor chamber producing rotation. Low pressure gas flows from the turbine exhaust through solenoid valve 78 into low pressure receiver 76 and through metering pump 80 through valve 86 into cylinder 2 charging it. When cylinder 2 is charged valves 64 and 86 close. Simultaneously, valves 24, 66 and 88 open. Oil is admitted into cylinder 2, starting compression of the gas and oil is then discharged from cylinder 3 through valve 48 preparing cylinder 3 for charging with low pressure gas through valve 88. High pressure gas valve 66 in cylinder 4 and low pressure gas intake valve 88 of cylinder 3 open. High pressure gas from cylinder 4, which is already compressed, flows through the high pressure receiver 72 and through valves 70 and 74, which are open, to the turbine rotor chamber producing rotation. Low pressure gas flows from the turbine exhaust through solenoid valve 78 into low pressure receivers 76 and through metering pump 82 through valve 88 into cylinder 3 charging it. When cylinder 3 is charged valves 66 and 88 close. Simultaneously, valves 34, 60 and 90 open. Oil is admitted into cylinder 3 starting compression of the gas, and oil is then discharged from cylinder 4 through valve 50 preparing cylinder 4 for charging with low pressure gas through valve 90, starting a new cycle of operation.

The sequence of valve operation with respect to the charge-discharge conditions of the cylinders is summarized as follows

| Cylinder Discharging To Turbine | Cylinder Charging | Valves Open |
|---|---|---|
| 4 | 3 | 66-70-74-78-88 |
| 3 | 2 | 64-70-74-78-86 |
| 2 | 1 | 62-70-74-78-84 |
| 1 | 4 | 60-70-74-78-90 |

It will be understood that valves 32, 24, 34 and 26, which control the supply of high pressure oil from pumps 10 and 12 to the cylinders 1, 2, 3 and 4, and valves 44, 46, 48, 50, which control the discharge of oil from the cylinder to the oil reservoir 18, valves 60, 62, 64, 66 which control the supply of high pressure gas to the turbine rotor chamber, valves 84, 86, 88, 90 which control the return of the low pressure gas to cylinders 1, 2, 3 and 4, and valves 70, 74 and 78 are all open-shut solenoid operated, and may be controlled by computers or other known means of automatic control for operation in the desired sequence.

The preferred operating interval for high pressure gas discharge valves 60, 62, 64, 66 and low pressure gas charge valves 84, 86, 88, 90 will be one second, and for the high pressure oil charge valves 32, 24, 34 and 36 and oil discharge valves 44, 46, 48, 50 will be two (2) seconds, but these preferred intervals can be increased or decreased to produce desired results.

In a high pressure gas system such as that according to this invention it is necessary to use a gas which will not liquefy at the pressures and temperatures of use, and the gas must therefore be maintained at a temperature above its critical temperature. The characteristics of gases are supplied by the manufacturer. The Redlich-Kwong formula which follows is used for calculating the relationship between the volume of gas in cubic feet, pressure of the gas in psi absolute, temperature of the gas in degrees Rankin, number of moles present in the gas in pounds, the universal gas constant being 10.73. In order to use this formula the critical temperature of the gas in degrees Rankin, and the critical pressure in psi absolute, must be known.

Equations:

Ideal gas: $PV = nRT$

Redlich-Kwong: $P = \dfrac{nRT}{(V-b)} - \dfrac{a}{T^{\frac{1}{2}} V(V+b)}$ $a = 4.934\, b\, nRT_c^{1.5}$ $b = 0.0867\, \dfrac{nRT_c}{P_c}$ where:
P is the absolute pressure;
V is the volume;
n is the number of moles present;
R is the universal gas constant;
T is the absolute temperature;
$T_c$ is the critical temperature;
$P_c$ is the critical pressure.

I have found that a commercially available gas known as R-23 ($CHF_3$), manufactured by Specialty Chemical Division of Allied Chemical Corporation is satisfactory for use in the system, the characteristics of this gas being

| Molecular Weight | 69.989 |
|---|---|
| Critical Temperature | 501.52 degrees Rankin |
| Critical Pressure | 638.31 psi absolute |

This gas is non-toxic, non-explosive, non-corrosive, non-flamable, and very stable.

I claim:

1. A turbine having an inlet and an outlet, and means for operating the turbine comprising:
   at least three cylinders each having a free piston therein dividing the cylinder into an oil chamber and a gas chamber,
   means for supplying oil under pressure to the oil chambers of the cylinders in a pre-determined sequence to operate the pistons and compress the gas in the gas chambers in that sequence, a plurality of conduits, each conduit connecting one of the gas chambers to the inlet of the turbine,
means for causing high pressure compressed gas to flow through the conduits to the inlet of the turbine in the same pre-determined sequence, and means for causing low pressure gas to flow from the outlet of the turbine solely to the gas chamber of that one of the cylinders which is next to be supplied with oil under pressure, said gas chambers, conduits, and turbine defining a closed gas filled system.

* * * * *